(12) United States Patent
Gilbert et al.

(10) Patent No.: US 9,112,979 B2
(45) Date of Patent: Aug. 18, 2015

(54) KEYWORD ALERTING IN CONFERENCE CALLS

(75) Inventors: Ezra Raphael Gilbert, Highland Park, NJ (US); Vipul Kishore Lalka, Highland Park, NJ (US); Venkat R. Gilakattula, Matawan, NJ (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/245,847

(22) Filed: Sep. 26, 2011

(65) Prior Publication Data

US 2012/0035930 A1 Feb. 9, 2012

Related U.S. Application Data

(63) Continuation of application No. 11/688,748, filed on Mar. 20, 2007, now Pat. No. 8,059,807.

(51) Int. Cl.
*H04M 3/42* (2006.01)
*H04M 3/56* (2006.01)
*H04M 3/22* (2006.01)

(52) U.S. Cl.
CPC .............. *H04M 3/56* (2013.01); *H04M 3/2281* (2013.01); *H04M 2203/651* (2013.01); *H04M 2250/62* (2013.01)

(58) Field of Classification Search
CPC .... H04M 3/533; H04M 2201/40; H04M 3/56
USPC ............................. 704/9, 235, 270; 379/93.26
See application file for complete search history.

(56) References Cited

U.S. PATENT DOCUMENTS

| | | | |
|---|---|---|---|
| 5,631,904 A | 5/1997 | Fitser et al. | |
| 5,819,171 A | 10/1998 | Hoogerwerf et al. | |
| 6,801,610 B1 | 10/2004 | Malik | |
| 6,839,417 B2 | 1/2005 | Weisman et al. | |
| 6,865,403 B1 | 3/2005 | Averkamp | |
| 7,191,129 B2 | 3/2007 | Brown et al. | |
| 7,400,711 B1 | 7/2008 | Ford et al. | |
| 7,660,850 B2 | 2/2010 | Tidwell et al. | |
| 8,019,069 B1 | 9/2011 | Cyriac et al. | |
| 2004/0083101 A1 | 4/2004 | Brown et al. | |
| 2004/0131161 A1 | 7/2004 | Schwartz et al. | |
| 2004/0184586 A1 | 9/2004 | Coles et al. | |
| 2004/0186712 A1* | 9/2004 | Coles et al. | 704/235 |
| 2004/0228463 A1* | 11/2004 | Sauvage et al. | 379/202.01 |

OTHER PUBLICATIONS

Notice of Allowance dated Dec. 12, 2014 for related U.S. Appl. No. 13/245,847.
Non-Final Rejection dated Jul. 10, 2014 for related U.S. Appl. No. 13/245,847.

(Continued)

*Primary Examiner* — Simon King

(57) ABSTRACT

A conferencing system is disclosed in which a participant to a conference call can program the embodiment to listen for one or more "keywords" in the conference call. The keywords might be a participant's name or words associated with him or her or words associated with his or her area of knowledge. The embodiments uses speech recognition technology to listen for those words. When the embodiments detects that those words have been spoken, the embodiment alerts the participant—using audible, visual, and/or tactile signals—that the participant's attention to the call is warranted. When the keywords are chosen wisely, the benefit can be great.

2 Claims, 4 Drawing Sheets

(56) References Cited

OTHER PUBLICATIONS

Non-Final Rejection dated Oct. 13, 2010 for related U.S. Appl. No. 11/688,748.

Final Rejection dated May 9, 2011 for related U.S. Appl. No. 11/688,748.

Notice of Allowance dated Aug. 25, 2011 for related U.S. Appl. No. 11/688,748.

* cited by examiner

KEYWORD ALERTING IN CONFERENCE CALLS

CROSS-REFERENCE TO RELATED APPLICATIONS

The present application claims priority under the laws and rules of the United States, including 35 USC § 120, to the following patent application. The present application is a divisional application of U.S. application Ser. No. 11/688,748 filed Mar. 20, 2007, the contents of which are hereby incorporated by reference in its entirety.

FIELD OF THE INVENTION

The present invention relates to telecommunications in general, and, more particularly, to new features of telecommunications systems.

BACKGROUND OF THE INVENTION

Conference calls are a mainstay of modern business life, and, therefore, the need exists for inventions that improve the quality and usability of conference calls.

SUMMARY OF THE INVENTION

One of the principal disadvantages of conference calls in the prior art is that they often waste the participants' time. For example, a conference call can comprise long intervals that are not relevant to many of the participants, which leads many participants mute their microphone and attend to other tasks. To the extent that those intervals are not relevant, this is a good thing because, as a practical matter, those people can use the time for more profitable work.

The problem is, of course, that when a participant's active participation becomes necessary, he or she has been preoccupied and have not been paying attention. This is especially true when the timing of the participation is unpredictable or unexpected. Some embodiments of the present invention seek to address this problem.

In accordance with some embodiments of the present invention, a participant to a conference call can program the embodiment to listen for one or more "keywords" in the conference call. The keywords might be a participant's name or words associated with his or her area of knowledge. The embodiments of the present invention use speech recognition technology to listen for those words. When the embodiments detects that those words have been spoken, the embodiment alerts the participant—using audible, visual, and/or tactile signals—that the participant's attention to the call is warranted. When the keywords are chosen wisely, the benefit of the present invention can be great.

Some embodiments of the present invention comprise: establishing a call comprising a first telecommunications terminal, a second telecommunications terminal, and a third telecommunications terminal; receiving a first directive signal to transmit a first alert signal to the second telecommunications terminal when a first keyword is spoken in the call; detecting that the first keyword is spoken in the call; and transmitting the first alert signal to the second telecommunications signal because the first keyword has been spoken in the call.

DETAILED DESCRIPTION

Figure 1:
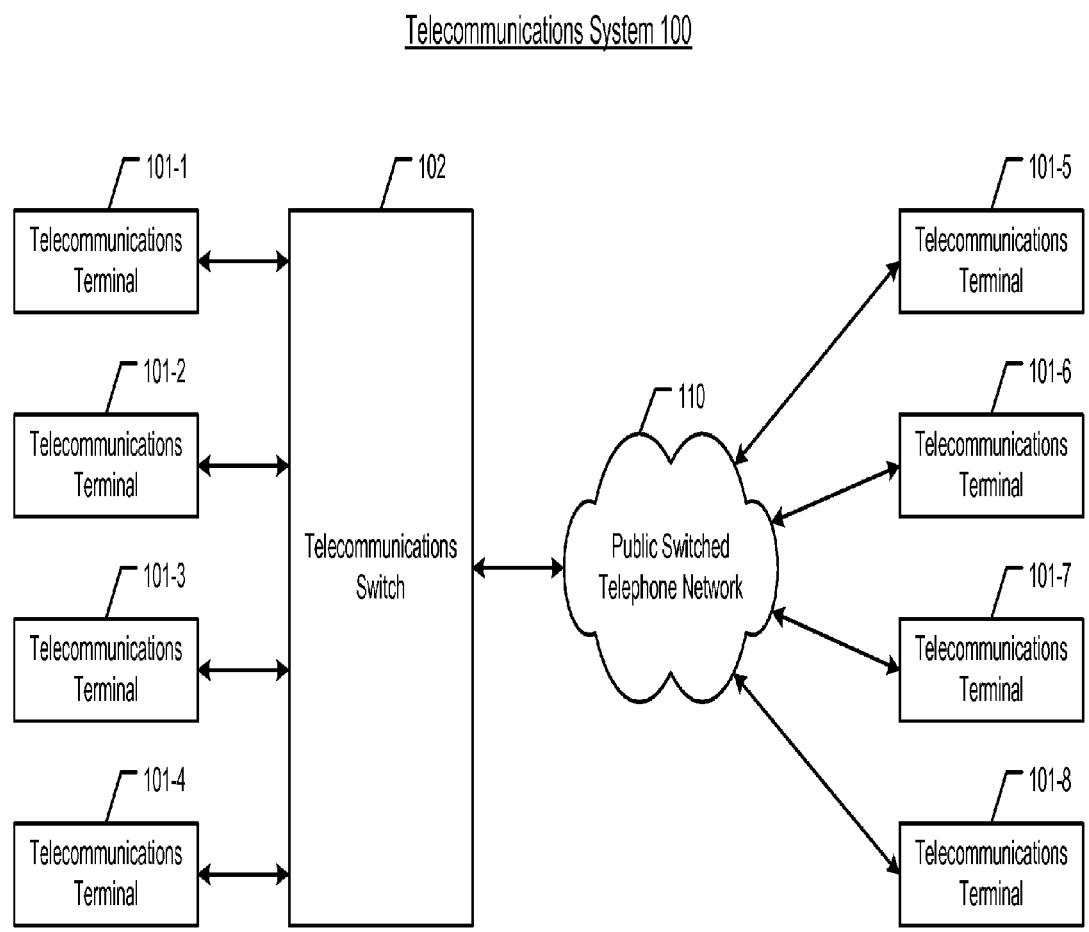
FIG. 1 depicts a schematic diagram of the salient components of telecommunications system 100 in accordance with the first illustrative embodiment of the present invention.

FIG. 1 depicts a schematic diagram of the salient components of telecommunications system 100 in accordance with the first illustrative embodiment of the present invention. Telecommunications system 100 comprises: telecommunications terminals 101-1, 101-2, 101-3, 101-4, 101-5, 101-6, 101-7, 101-8, telecommunications switch 102, and Public Switched Telephone Network (PSTN) 110, interconnected as shown.

The first illustrative embodiment is switch "centric" in the sense that all of the salient signaling to and from the various telecommunications terminals involves telecommunications switch 102. This is contrast to the second illustrative embodiment, which is described in detail below, in which the salient signaling between the telecommunications terminals is peer-to-peer and does not require a single centralized entity.

Although the first illustrative embodiment comprises four telecommunications terminals connected directly to telecommunications switch 102 and four telecommunications terminals connected to telecommunications switch 102 via Public Switched Telephone Network 110, it will be clear to those skilled in the art, after reading this specification, how to make and use alternative embodiments of the present invention that comprise:

i. any number of telecommunications terminals that are connected directly to telecommunications switch 102, or ii. any number of telecommunications terminals that are connected to telecommunications switch 102 via Public Switched Telephone Network 110, or iii. any combination of i and ii.

In accordance with the first illustrative embodiment, telecommunications terminal 101-$i$, wherein i$\in$\{1, 2, 3, 4, 5, 6, 7, 8\}, is a device (e.g. a cell-phone, wireless terminal, personal digital assistant, wireline telephone, etc.) that is capable of performing the functionality described below and in the accompanying figure. For example, telecommunications terminal 101-$i$ provides bi-directional audio communications service to a user. Although the first illustrative embodiment comprises identical telecommunications terminals, it will be clear to those skilled in the art, after reading this specification, how to make and use embodiments of the present invention in which some or all of the telecommunications terminals are not identical. It will be clear to those skilled in the art, after reading this specification, how to make and use telecommunications terminal 101-$i$.

Telecommunications switch 102 is a switch that is capable of performing the functionality described below and the accompanying figures.

Public Switched Telephone Network 110 is the Public Switched Telephone Network as is well known to those skilled in the art. Although the first illustrative embodiment uses the Public Switched Telephone Network, it will be clear to those skilled in the art, after reading this specification, how to make and use alternative embodiments of the present invention that use a different network (e.g., the Internet, etc.).

Figure 2:
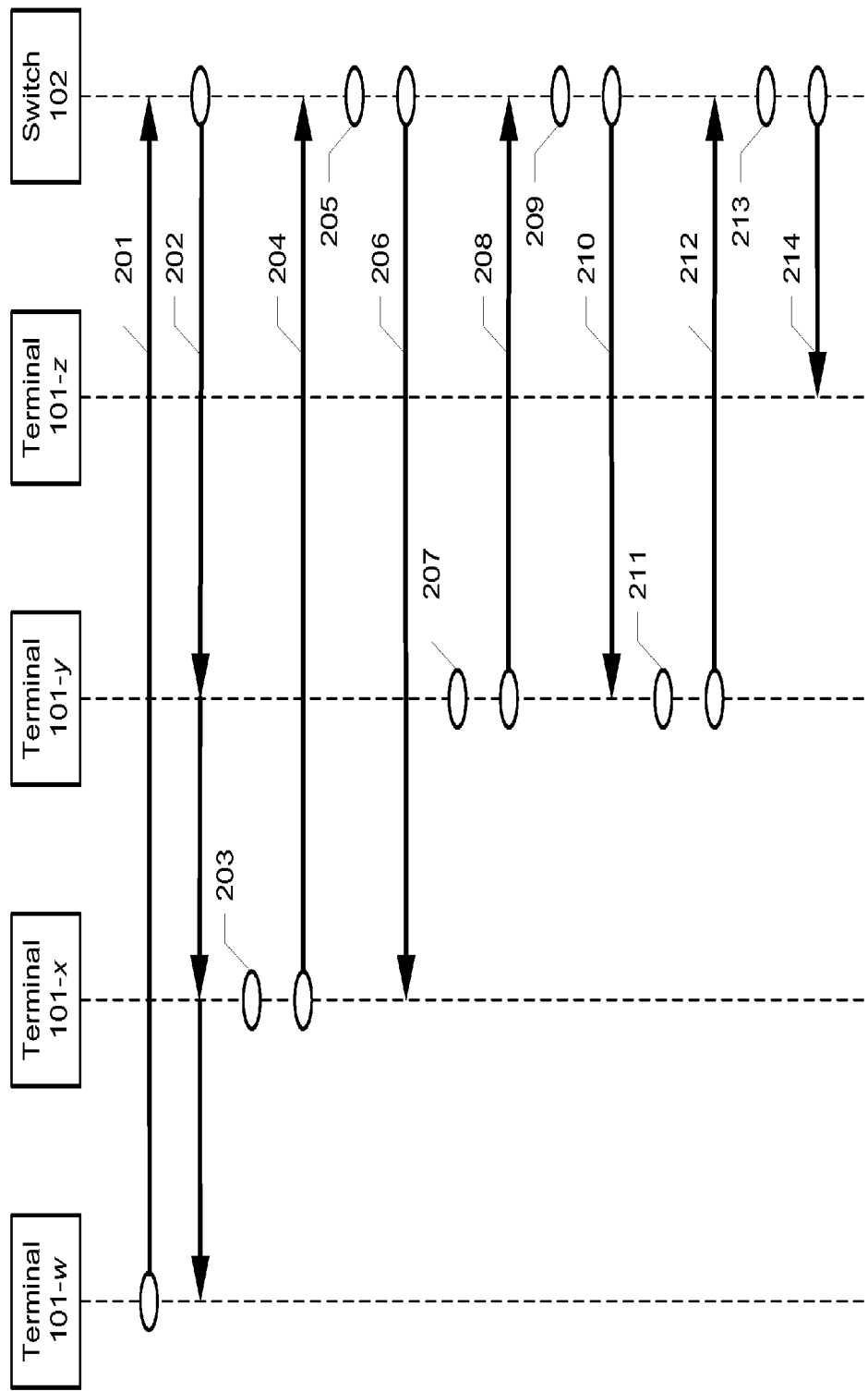
FIG. 2 depicts a flowchart of the salient tasks performed by the first illustrative embodiment of the present invention.

FIG. 2 depicts a flowchart of the salient tasks performed by the first illustrative embodiment of the present invention. The first illustrative embodiment comprises four telecommunications terminals 101-*w*, 101-*x*, 101-*y*, 101-*z*, and switch 102, wherein w, x, y, and z∈{1, 2, 3, 4, 5, 6, 7, 8} and w≠x≠y≠z.

At task 201, telecommunications terminal 101-*w* transmits and switch 102 receives a request to establish a call comprising telecommunications terminal 101-*w*, 101-*x*, and 101-*y*, in well-known fashion. It will be clear to those skilled in the art how to make and use alternative embodiments of the present invention in which:

i. telecommunications terminal 101-*w*, or
ii. telecommunications terminal 101-*x*, or
iii. telecommunications terminal 101-*y*, or
iv. any combination of i, ii, and iii request the establishment of the call comprising telecommunications terminal 101-*w*, 101-*x*, and 101-*y*.

At task 202, switch 102 establishes a call comprising telecommunications terminal 101-*w*, 101-*x*, and 101-*y*, in well-known fashion.

At task 203, telecommunications terminal 101-*x* receives from its user a directive to alert the user of telecommunications terminal 101-*x* when the first alert condition has been satisfied with respect to the call. For the purposes of this specification, an "alert condition" is defined as:

i. the speaking of a first keyword, or
ii. the speaking of a first keyword N times within a time interval $t_0$, or
iii. the speaking of a first Boolean expression of keywords (e.g., "John" and ("dog" or "cat" or "fish"), "John" and "cat" but excluding those occurrences that also contain "food", etc.) within a time interval $t_1$ in a call by:

i. any one participant to the call (e.g., "Sue" but not "Steve" or "John", etc.), or
ii. any combination of participants to the call (e.g., "Sue" and "Steve" but not "John", etc.).

As part of task 203, the user of telecommunications terminal 101-*x* specifies the exact parameters of the first alert condition (i.e., the keyword or keywords and who must speak them). Upon the completion of task 203, the user of telecommunications terminal 101-*x* puts telecommunications terminal 101-*x* on mute and goes about other business than focusing on the call.

It will be clear to those skilled in the art, after reading this specification, how to make and use alternative embodiments of the present invention in which it is telecommunications terminal 101-*w* or 101-*y*, rather than telecommunications terminal 101-*x*, that receives from its user the directive to alert the user of telecommunications terminal 101-*x* when the first alert condition is satisfied.

At task 204, telecommunications terminal 101-*x* transmits and switch 102 receives (i) the directive to transmit the first alert signal to telecommunications terminal 101-*x* when the first alert condition has been satisfied, and (ii) the exact parameters of the first alert condition. In those alternative embodiments where it is telecommunications terminal 101-*w* or 101-*y*, rather than telecommunications terminal 101-*x*, that receives from its user the directive to alert the user of telecommunications terminal 101-*x* when the first alert condition has been satisfied with respect to the call, it is telecommunications terminal 101-*w* or 101-*y*, respectively, rather than telecommunications terminal 101-*x*, that transmits the directive to switch 102 that directs switch 102 to transmit the first alert signal to telecommunications terminal 101-*x* when the first alert condition is satisfied.

At task 205, switch 102 monitors the call for the satisfaction of the first alert condition. In accordance with the illustrative embodiment, switch 102 uses speech recognition technology, in well-known fashion, to monitor the call and detect the keyword or keywords in the first alert condition. It will be clear to those skilled in the art how to make and use a switch that can monitor a call for the satisfaction of any alert condition.

At task 206, switch 102 detects the satisfaction of the first alert condition, and, as a result, transmits, so that telecommunications terminal 101-*x* receives, the first alert signal. As part of task 206, telecommunications terminal 101-*x* alerts its user to the fact that the first alert condition was satisfied. In accordance with the illustrative embodiment, the alert is any combination of visual, audible, and tactile stimulants.

At task 207, telecommunications terminal 101-*y* receives from its user a directive to alert the user of telecommunications terminal 101-*y* when a second alert condition has been satisfied with respect to the call. As part of task 207, the user of telecommunications terminal 101-*y* specifies the exact parameters of the second alert condition. Upon the completion of task 207, the user of telecommunications terminal 101-*y* puts telecommunications terminal 101-*y* on mute and goes about other business than focusing on the call.

It will be clear to those skilled in the art, after reading this specification, how to make and use alternative embodiments of the present invention in which it is telecommunications terminal 101-*w* or 101-*x*, rather than telecommunications terminal 101-*y*, that receives from its user the directive to alert the user of telecommunications terminal 101-*y* when the second alert condition is satisfied.

At task 208, telecommunications terminal 101-*y* transmits and switch 102 receives (i) the directive to transmit the second alert signal to telecommunications terminal 101-*y* when the second alert condition has been satisfied, and (ii) the exact parameters of the second alert condition. In those alternative embodiments where it is telecommunications terminal 101-*w* or 101-*x*, rather than telecommunications terminal 101-*y*, that receives from its user the directive to alert the user of telecommunications terminal 101-*y* when the second alert condition has been satisfied with respect to the call, it is telecommunications terminal 101-*w* or 101-*x*, respectively, rather than telecommunications terminal 101-*y*, that transmits the directive to switch 102 that directs switch 102 to transmit the second alert signal to telecommunications terminal 101-*x* when the second alert condition is satisfied.

At task 209, switch 102 monitors the call for the satisfaction of the second alert condition. In accordance with the illustrative embodiment, switch 102 uses speech recognition technology, in well-known fashion, to monitor the call and detect the keyword or keywords in the second alert condition.

At task 210, switch 102 detects the satisfaction of the second alert condition, and, as a result, transmits, so that telecommunications terminal 101-*y* receives, the second alert signal. As part of task 206, telecommunications terminal 101-*y* alerts its user to the fact that the second alert condition was satisfied. In accordance with the illustrative embodiment, the alert is any combination of visual, audible, and tactile stimulants.

At task 211, telecommunications terminal 101-*y* receives from its user a directive to add the user of telecommunications terminal 101-*z* when a third alert condition has been satisfied with respect to the call. As part of task 211, the user of telecommunications terminal 101-*y* specifies the exact parameters of the third alert condition.

It will be clear to those skilled in the art, after reading this specification, how to make and use alternative embodiments of the present invention in which it is telecommunications terminal 101-*w* or 101-*x*, rather than telecommunications terminal 101-y, that receives from its user the directive to add the user of telecommunications terminal 101-z when the third alert condition is satisfied.

At task 212, telecommunications terminal 101-y transmits and switch 102 receives (i) the directive to transmit the third alert signal to telecommunications terminal 101-y when the third alert condition has been satisfied, and (ii) the exact parameters of the third alert condition. In those alternative embodiments where it is telecommunications terminal 101-w or 101-x, rather than telecommunications terminal 101-y, that receives from its user the directive to alert the user of telecommunications terminal 101-y when the third alert condition has been satisfied with respect to the call, it is telecommunications terminal 101-w or 101-x, respectively, rather than telecommunications terminal 101-y, that transmits the directive to switch 102 that directs switch 102 to transmit the third alert signal to telecommunications terminal 101-x when the third alert condition is satisfied.

At task 213, switch 102 monitors the call for the satisfaction of the third alert condition. In accordance with the illustrative embodiment, switch 102 uses speech recognition technology, in well-known fashion, to monitor the call and detect the keyword or keywords in the third alert condition.

At task 214, switch 102 detects the satisfaction of the third alert condition, and, as a result, adds telecommunications terminal 101-z to the call. As part of task 214, telecommunications terminal 101-z alerts its user to the fact that switch 102 is attempting to add telecommunications terminal 101-z to the call, the user responds, and telecommunications terminal 101-z is added to the call. In accordance with the illustrative embodiment, the alert is any combination of visual, audible, and tactile stimulants.

Figure 3:
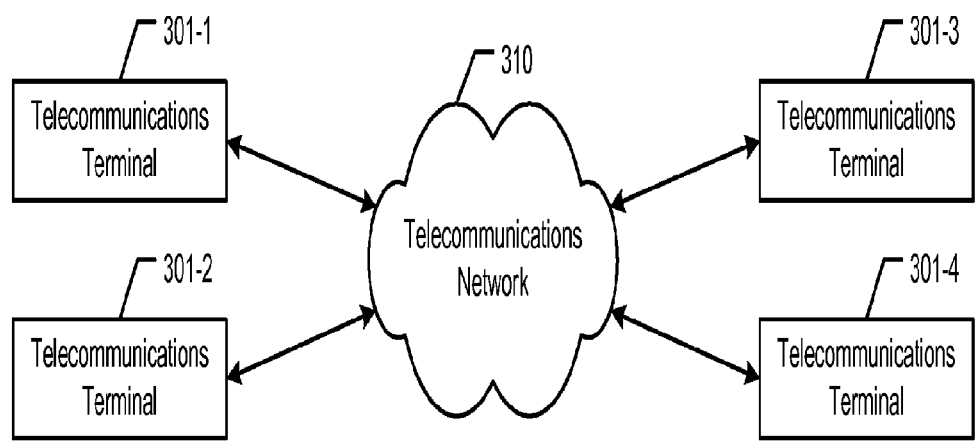
FIG. 3 depicts a schematic diagram of the salient components of telecommunications system 300 in accordance with the second illustrative embodiment of the present invention.

FIG. 3 depicts a schematic diagram of the salient components of telecommunications system 300 in accordance with the second illustrative embodiment of the present invention. Telecommunications system 300 comprises: telecommunications terminals 301-1, 301-2, 301-3, 301-4, and telecommunications network 310, interconnected as shown.

In accordance with the second illustrative embodiment, the salient signaling between the telecommunications terminals is peer-to-peer and does not involve a single centralized entity, in contrast to the signaling in the first illustrative embodiment, which is switch "centric" in the sense that all of the signaling to and from the various telecommunications terminals involves telecommunications switch 102.

Although the illustrative embodiment comprises four telecommunications terminals connected directly to telecommunications network 310, it will be clear to those skilled in the art, after reading this specification, how to make and use alternative embodiments of the present invention that comprise any number of telecommunications terminals.

In accordance with the second illustrative embodiment, telecommunications terminal 301-i, wherein i∈{1, 2, 3, 4}, is a device (e.g. a wireless, hands-free telephone headset, desk telephone, etc.) that is capable of performing the functionality described below and in the accompanying figure. For example, telecommunications terminal 301-i provides bi-directional audio communications service to one or more users. Although the second illustrative embodiment comprises identical telecommunications terminals, it will be clear to those skilled in the art, after reading this specification, how to make and use embodiments of the present invention in which some or all of the telecommunications terminals are identical. It will be clear to those skilled in the art, after reading this specification, how to make and use telecommunications terminal 301-i.

Telecommunications network 310 is the a TCP/IP network as is well known to those skilled in the art. Although the second illustrative embodiment uses TCP/IP, it will be clear to those skilled in the art, after reading this specification, how to make and use alternative embodiments of the present invention that use a different protocols.

Figure 4:
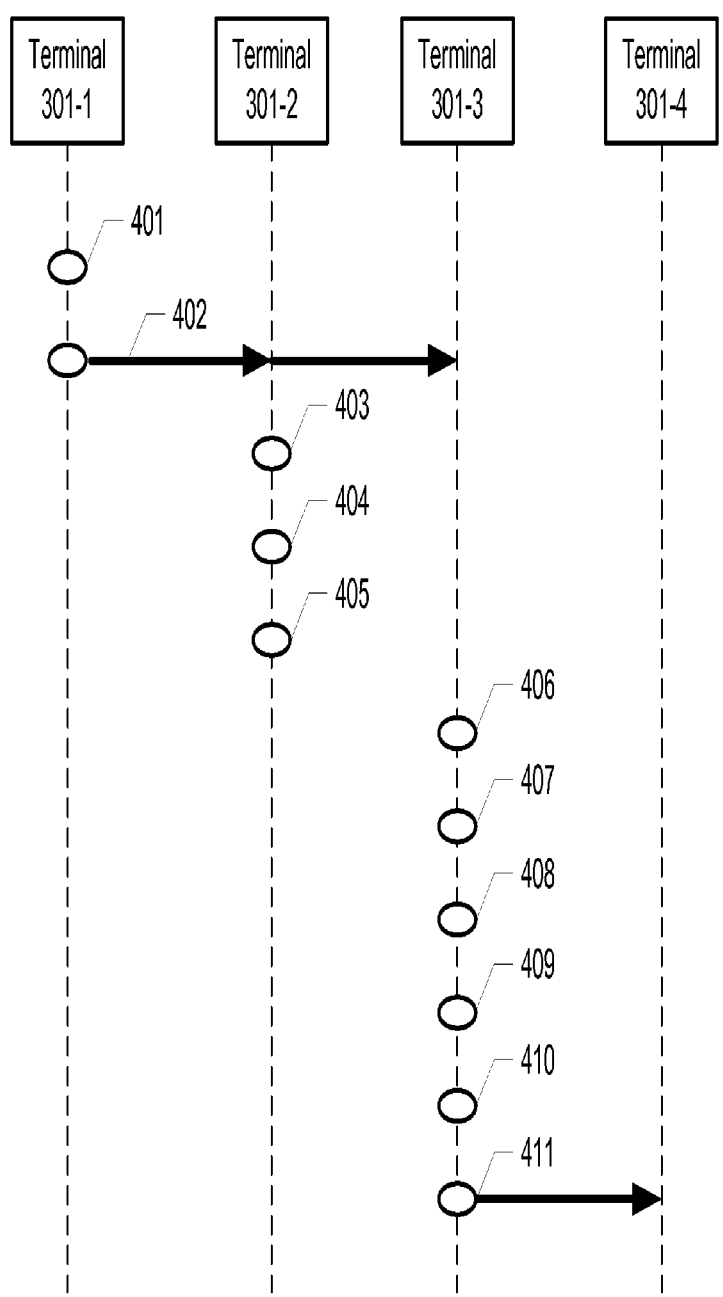
FIG. 4 depicts a flowchart of the salient tasks performed by the second illustrative embodiment of the present invention.

FIG. 4 depicts a flowchart of the salient tasks performed by the second illustrative embodiment of the present invention. In accordance with the second illustrative embodiment, all of the relevant signaling is among four telecommunications terminals 301-1, 301-2, 301-3, 301-4.

At task 401, telecommunications terminal 301-1 receives from its user a directive to establish a call comprising telecommunications terminals 301-1, 301-2, and 301-3, in well-known fashion. It will be clear to those skilled in the art, after reading this specification, how to make and use alternative embodiments of the present invention in which any combination of telecommunications terminal 301-1, 301-2, and 301-3 receives a directive to establish a call comprising telecommunications terminal 301-1, 301-2, and 301-3.

At task 402, telecommunications terminal 301-1 establishes a call comprising
telecommunications terminal 301-1, 301-2, and 301-3, in well-known fashion. It will be clear to those skilled in the art, after reading this specification, how to make and use alternative embodiments of the present invention in which any combination of telecommunications terminal 301-1, 301-2, and 301-3 establish the call comprising telecommunications terminal 301-1, 301-2, and 301-3.

At task 403, telecommunications terminal 301-2 receives from its user a directive to alert the user of telecommunications terminal 301-2 when the first alert condition has been satisfied with respect to the call. As part of task 403, the user of telecommunications terminal 301-2 specifies the exact parameters of the first alert condition. Upon the completion of task 403, the user of telecommunications terminal 301-2 puts telecommunications terminal 301-2 on mute and goes about other business than focusing on the call.

It will be clear to those skilled in the art, after reading this specification, how to make and use alternative embodiments of the present invention in which it is telecommunications terminal 301-1 or 301-3, rather than telecommunications terminal 301-2, that receives from its user the directive to alert the user of telecommunications terminal 301-2 when the first alert condition is satisfied.

At task 404, telecommunications terminal 301-2 monitors the call for the satisfaction of the first alert condition. In accordance with the illustrative embodiment, telecommunications terminal 301-2 uses speech recognition technology, in well-known fashion, to monitor the call and detect the keyword or keywords in the first alert condition.

It will be clear to those skilled in the art, after reading this specification, how to make and use alternative embodiments of the present invention in which one telecommunications terminal receives (i) the directive to transmit the first alert signal to telecommunications terminal 301-2 when the first alert condition has been satisfied, and (ii) the exact parameters of the first alert condition, but forwards the directive and parameters to another telecommunications terminal for monitoring.

At task 405, telecommunications terminal 301-2 detects the satisfaction of the first alert condition, and, as a result, alerts its user to the fact that the first alert condition was satisfied. In accordance with the illustrative embodiment, the alert is any combination of visual, audible, and tactile stimulants.

In the alternative embodiments in which a telecommunications terminal other than telecommunications terminal 301-2 monitors the call for the satisfaction of the first alert condition, that terminal, upon detecting the satisfaction of the first alert condition, transmits, so that telecommunications terminal 301-2 receives, the first alert signal.

At task 406, telecommunications terminal 301-3 receives from its user a directive to alert the user of telecommunications terminal 301-3 when the second alert condition has been satisfied with respect to the call. As part of task 406, the user of telecommunications terminal 301-3 specifies the exact parameters of the second alert condition. Upon the completion of task 406, the user of telecommunications terminal 301-3 puts telecommunications terminal 301-3 on mute and goes about other business than focusing on the call.

It will be clear to those skilled in the art, after reading this specification, how to make and use alternative embodiments of the present invention in which it is telecommunications terminal 301-1 or 301-2, rather than telecommunications terminal 301-3, that receives from its user the directive to alert the user of telecommunications terminal 301-3 when the second alert condition is satisfied.

At task 407, telecommunications terminal 301-3 monitors the call for the satisfaction of the second alert condition. In accordance with the illustrative embodiment, telecommunications terminal 301-3 uses speech recognition technology, in well-known fashion, to monitor the call and detect the keyword or keywords in the second alert condition. It will be clear to those skilled in the art how to make and use a switch that can monitor a call for the satisfaction of any alert condition.

It will be clear to those skilled in the art, after reading this specification, how to make and use alternative embodiments of the present invention in which one telecommunications terminal receives (i) the directive to transmit the second alert signal to telecommunications terminal 301-3 when the second alert condition has been satisfied, and (ii) the exact parameters of the second alert condition, but forwards the directive and parameters to another telecommunications terminal for monitoring.

At task 408, telecommunications terminal 301-3 detects the satisfaction of the second alert condition, and, as a result, alerts its user to the fact that the second alert condition was satisfied. In accordance with the illustrative embodiment, the alert is any combination of visual, audible, and tactile stimulants.

In the alternative embodiments in which a telecommunications terminal other than telecommunications terminal 301-3 monitors the call for the satisfaction of the second alert condition, that terminal, upon detecting the satisfaction of the second alert condition, transmits, so that telecommunications terminal 301-3 receives, the second alert signal.

At task 409, telecommunications terminal 301-3 receives from its user a directive to add the user of telecommunications terminal 301-4 to the call when the third alert condition has been satisfied with respect to the call. As part of task 409, the user of telecommunications terminal 301-3 specifies the exact parameters of the third alert condition.

It will be clear to those skilled in the art, after reading this specification, how to make and use alternative embodiments of the present invention in which it is telecommunications terminal 301-1 or 301-2, rather than telecommunications terminal 301-3, that receives from its user the directive to add the user of telecommunications terminal 301-4 to the call when the third alert condition is satisfied.

At task 410, telecommunications terminal 301-3 monitors the call for the satisfaction of the third alert condition. In accordance with the illustrative embodiment, telecommunications terminal 301-3 uses speech recognition technology, in well-known fashion, to monitor the call and detect the keyword or keywords in the third alert condition.

It will be clear to those skilled in the art, after reading this specification, how to make and use alternative embodiments of the present invention in which one telecommunications terminal receives (i) the directive to add telecommunications terminal 301-4 to the call when the third alert condition has been satisfied, and (ii) the exact parameters of the third alert condition, but forwards the directive and parameters to another telecommunications terminal for monitoring and execution.

At task 411, telecommunications terminal 301-3 detects the satisfaction of the third alert condition, and, as a result, adds the user of telecommunications terminal 301-3 to the call.

In the alternative embodiments in which a telecommunications terminal other than telecommunications terminal 301-3 monitors the call for the satisfaction of the third alert condition, that terminal, upon detecting the satisfaction of the third alert condition, adds the user of telecommunications terminal 301-3 to the call.

It is to be understood that the disclosure teaches just two illustrative embodiments of the present invention and that many variations of the invention can easily be devised by those skilled in the art after reading this disclosure and that the scope of the present invention is to be determined by the following claims.

What is claimed is:

1. A method comprising:
receiving by a data-processing system a first signal, wherein the first signal comprises a keyword and indicates that a user of a telecommunications terminal who participates in a conference call is to be notified when the keyword is automatically detected in audio data represent words spoken by another user during the conference call, wherein the user is not a member of a non-empty set S of people who participate in the conference call, and wherein the other user is a member of set S; and
when the keyword is detected in the audio data representing words spoken by another user during the conference call, transmitting by the data-processing system a second signal to the telecommunications terminal to alert the user that the keyword has been detected in the audio data.

2. The method of claim 1 further comprising:
receiving by the telecommunications terminal one or more user inputs that specify the keyword and indicate that the user is to be alerted when the keyword is automatically detected in the audio data representing words spoken by the other user during the conference call; and
in response to the one or more user inputs, transmitting by the telecommunications terminal the first signal to the data-processing system.

* * * * *